June 30, 1970  R. KLEIN, JR  3,517,645
APPARATUS FOR FINISH-SPRAYING OF SHOES
Filed Sept. 6, 1968  11 Sheets-Sheet 1

INVENTOR.
ROBERT KLEIN, JR.
BY
AGT.

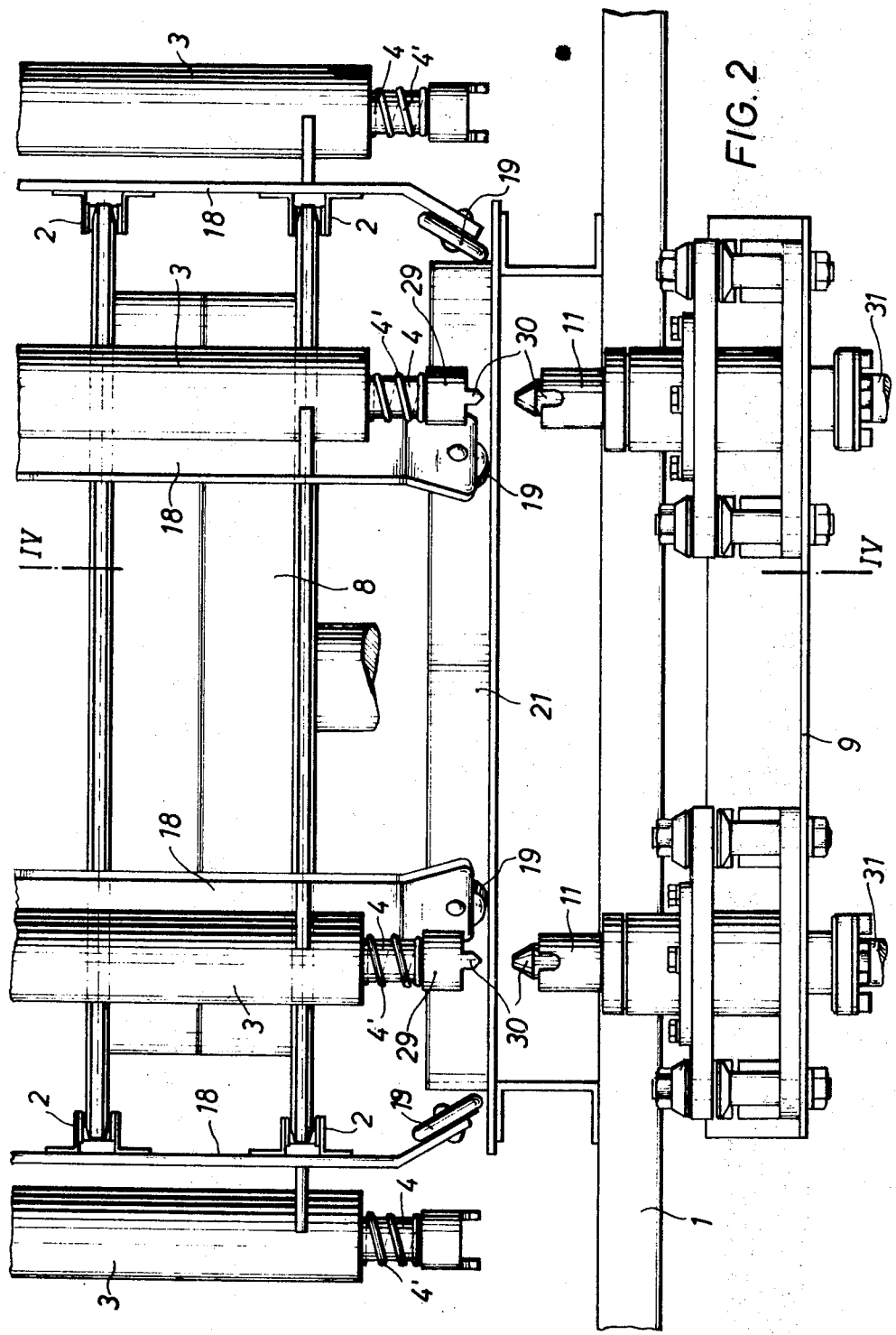

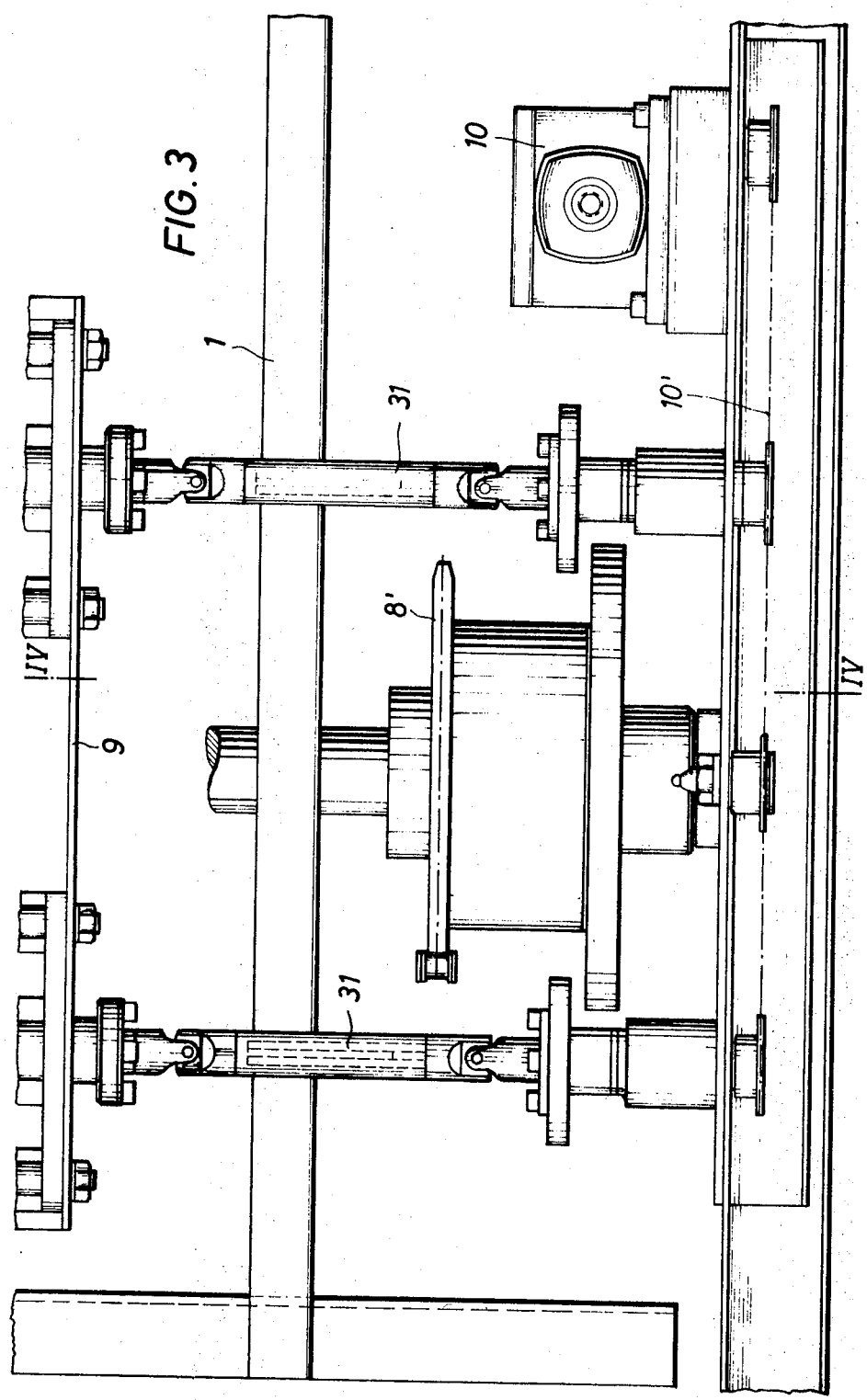

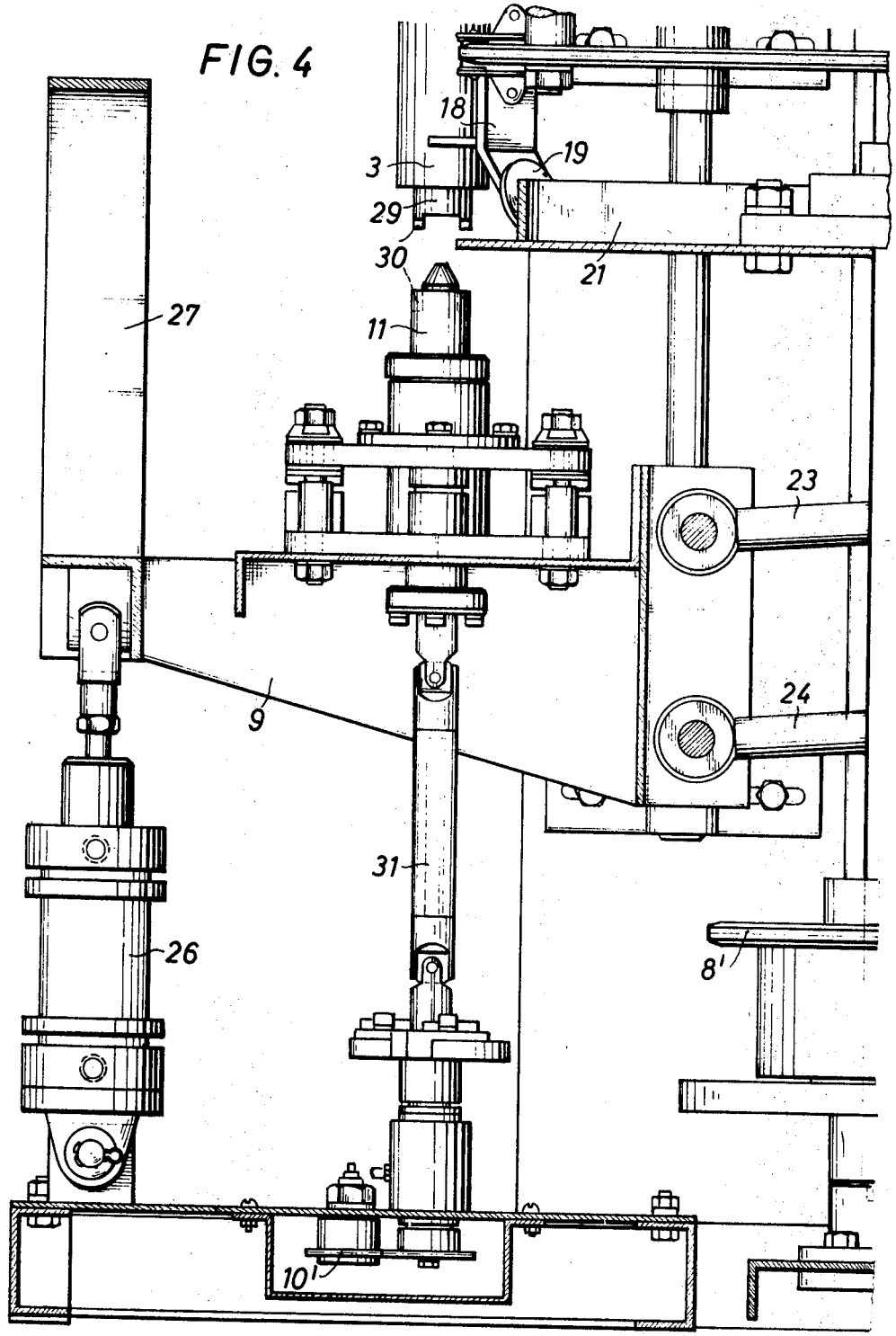

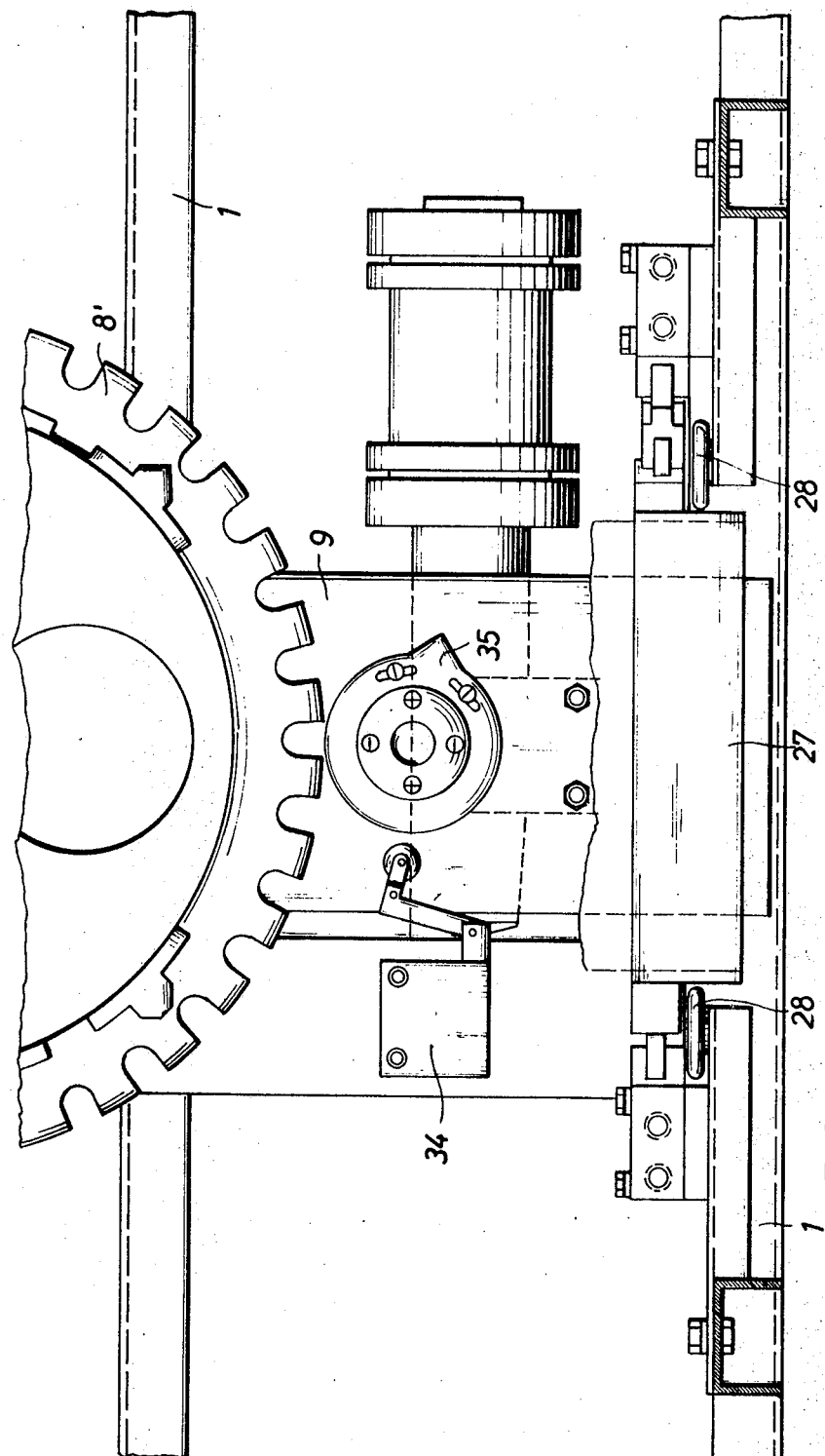

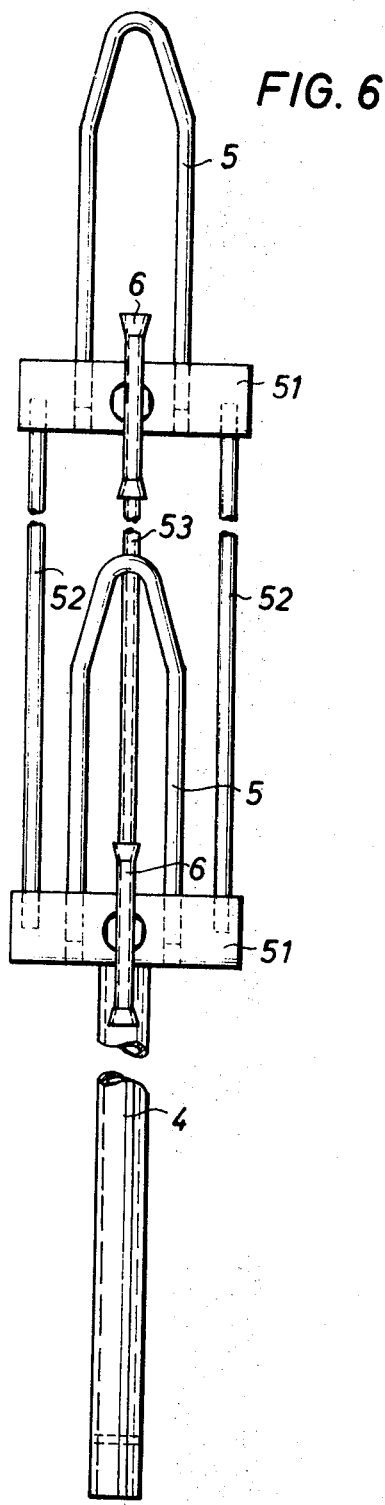
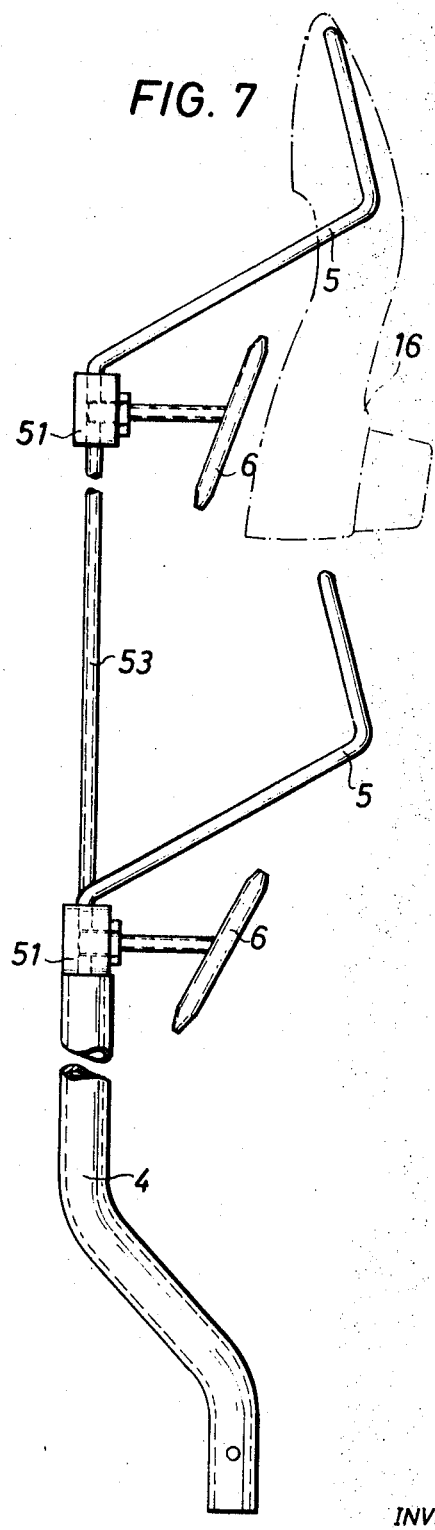

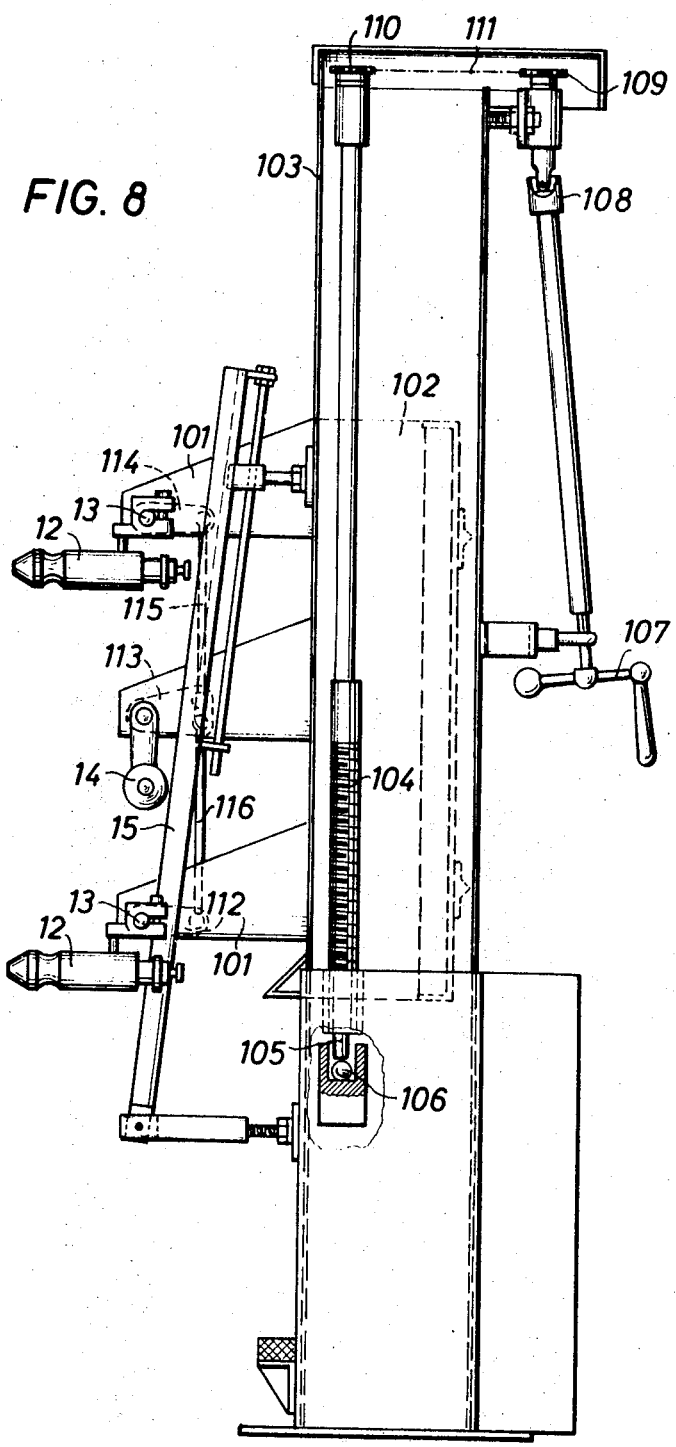

June 30, 1970  R. KLEIN, JR  3,517,645
APPARATUS FOR FINISH-SPRAYING OF SHOES
Filed Sept. 6, 1968  11 Sheets-Sheet 8

INVENTOR.
ROBERT KLEIN, JR.
BY
AGT.

June 30, 1970   R. KLEIN, JR   3,517,645
APPARATUS FOR FINISH-SPRAYING OF SHOES
Filed Sept. 6, 1968   11 Sheets-Sheet 9
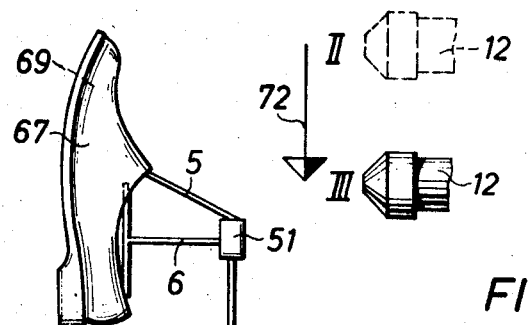
FIG. 11
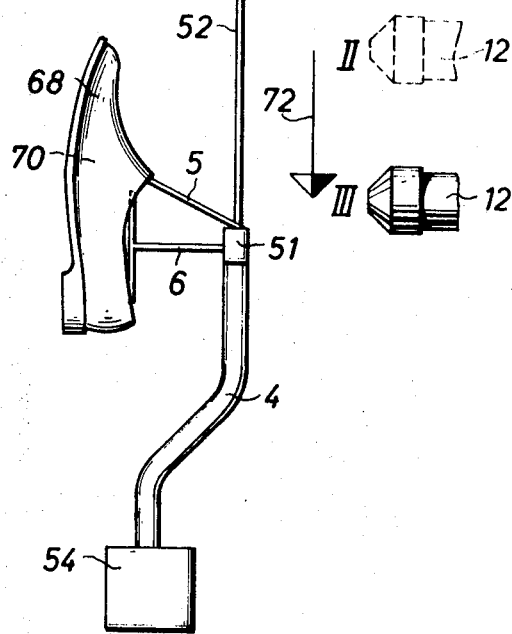
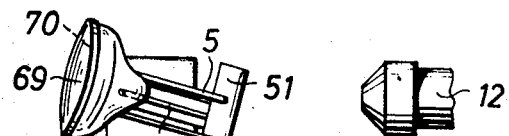
FIG. 12
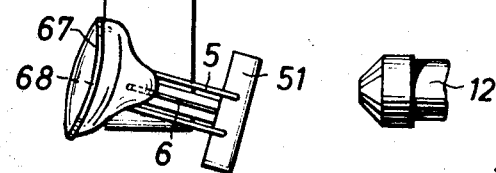
INVENTOR.
ROBERT KLEIN, JR.
BY
AGT.

June 30, 1970   R. KLEIN, JR   3,517,645
APPARATUS FOR FINISH-SPRAYING OF SHOES
Filed Sept. 6, 1968   11 Sheets-Sheet 10
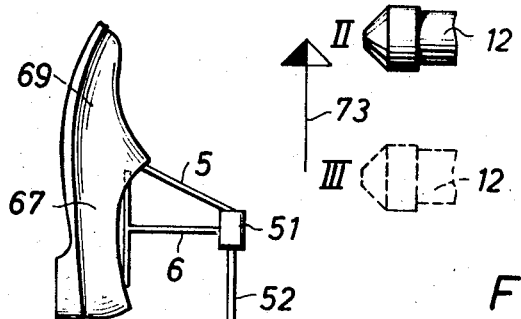
FIG. 13
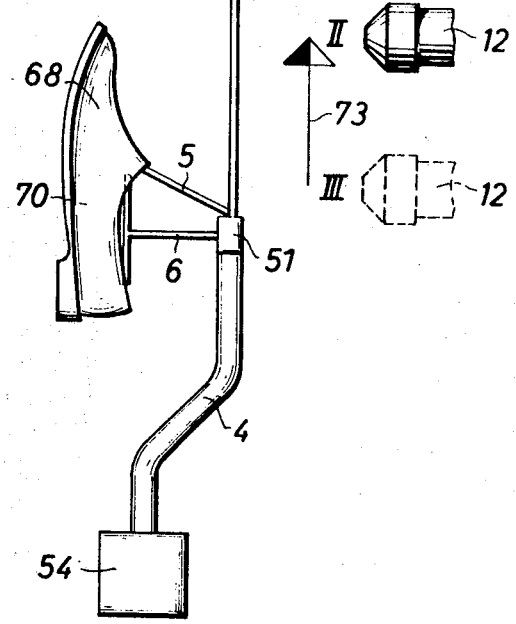
FIG. 14
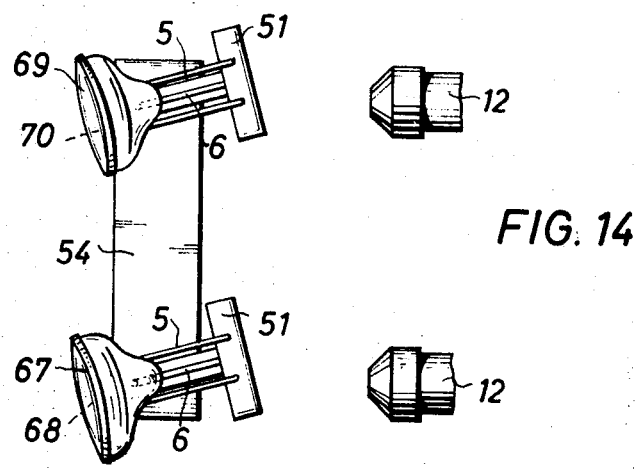
INVENTOR.
ROBERT KLEIN, JR.
BY
AGT.

INVENTOR.
ROBERT KLEIN, JR.
BY
Robert H Jacob
AGT.

3,517,645
APPARATUS FOR FINISH-SPRAYING OF SHOES
Robert Klein, Jr., Landauer-Strasse 56,
Pirmasens, Pfalz, Germany
Filed Sept. 6, 1968, Ser. No. 758,021
Claims priority, application Germany, Sept. 7, 1967,
1,685,433; Mar. 13, 1968, 1,685,436
Int. Cl. B05b 15/04, 13/04; B05c 5/00
U.S. Cl. 118—301                                9 Claims

ABSTRACT OF THE DISCLOSURE

Apparatus for finish-spraying of shoes comprising a transport means and a spraying cabinet where the transport means conducts the shoes through the spraying cabinet in which spray nozzles for spraying the finishing or dressing agent are disposed, and for guiding the shoes through the spraying cabinet, supports having yokes for hanging individual shoes are provided which supports are equipped with nozzle means for supplying compressed air to the interior of the shoes and, if desired, against the area of the sole.

BACKGROUND OF THE INVENTION

The invention relates to apparatus for treating shoes, and more in particular, the invention is concerned with an apparatus for finish-spraying of shoes. Regardless of the types of leather of which the upper of a shoe is made, and regardless of how the upper surface of this leather is constituted and treated, the shoe before being sold is subjected to a last working operation referred to as finishing. This finishing consists essentially in the operation of finish-spraying.

In the course of the rationalization and automation of the shoe manufacture, installations have been developed for this purpose which essentially comprise a transport device for the finished shoes which are supplied by means of this transport device to a spraying cabinet in which spraying nozzles are arranged that spray the upper surface of the shoe with the finishing agent as the shoe passes through the apparatus.

It is, of course, evident that only the outer surface of the shoe upper should be sprayed with the finishing agent. It is neither necessary nor desirable that the inside of the shoe upper and the walking sole of the shoe comes in contact with the finishing agent. In the apparatuses known heretofore, however, it could not be avoided that at least the border regions of the inside of the upper and the sole were sprayed so that furthermore a more or less heavy vapor of spraying agent predominated in the spraying cabinet so that practically all surfaces of the shoe came into contact with the finishing agent. Furthermore, care was to be taken that the finishing agent was used as sparingly as possible, i.e., only those surfaces were to be sprayed that had to be treated.

SUMMARY OF THE INVENTION

It is therefore an object of the invention is to provide an apparatus for finish-spraying of shoes which insures that in fact only the surfaces of the shoes to be treated, i.e., the outer surfaces of the shoe upper are treated with the finishing agent, while the inside of the shoe and the sole remain completely and reliably free of contact with the finishing agent. Furthermore, the coordination of footwear to be treated and the spraying nozzles should be such that spraying takes place only in the area of the footwear.

In accordance with the invention, the problem is dealt with by an installation for finish-spraying of footwear with a transport means and a spraying cabinet, where the transport means conducts the shoes through the spraying cabinet, and nozzles for spraying the finishing agent are arranged in this spraying cabinet where in accordance with the invention supports with yokes for suspending the individual shoes are provided, for guiding the footwear through the spraying cabinet, while these supports are furthermore equipped with nozzle arrangements for supplying air under pressure into the interior of the shoe and if desired, against the area of the sole.

This support is mounted on a guiding spindle which in turn is operatively connected with the transport means, while the transport means may be part of a transporting installation which carries the footwear through further working stations or which may solely be associated with the installation for finish-spraying.

Furthermore, the guiding spindle may advantageously cooperate with a lifting table, which as the spindle is at standstill raises the support with the shoes during the spraying operation, whereupon the spindle effects a rotation of 180° and then the lifting table together with spindle and support is again lowered.

Finally, the spraying nozzles provided in the spraying cabinet may in turn be adapted to be raised and lowered, while they effect a turning movement in a vertical plane by way of an articulated bearing that is guided by rollers and curved members or cams.

For supplying air under pressure to the supports and thus to the nozzles provided thereon an orifice may be provided on the lifting table which comes to rest against the lower end of the support that is moved by the transport means over the lifting table.

The turning means for turning the support may furthermore be so constructed that they not only effect a turning movement of the support by 180°, but that between the two contemplated spraying operations over the entire length of the shoe two further spraying steps are introduced for which the support is turned by about 15° relative to its two main positions. In this position also the shoe tongue is effectively and evenly reached and covered by the sprayed-on finishing agent.

The support may be constructed either with yokes and air nozzles for mounting two shoes or also for mounting four shoes. In the second embodiment as a double support an intermediate transmission is necessary, however, in order to transmit the turning movements of the turning means to the two supports which are disposed parallel to one another.

This intermediate transmission may be provided either on each of the supports or also in the area of the lifting table. In the latter case, there results a substantial savings because the intermediate transmission is required only once.

Finally, it is possible to arrange the spraying nozzles in addition to the individual lifting and lowering features already mentioned, to be adjustable in height as a unit. For this purpose the nozzles are disposed upon a vertically displaceable slide, the level or height of which is adjustable by means of a threaded spindle. The drive of the threaded spindle may be effected, for example, by way of a crank shaft at a convenient height.

By means of the arrangement in accordance with the invention, it is accomplished on the one hand that the air under pressure flowing into the interior of the shoe to be treated and in given cases air under pressure flowing over the surface of the soles, these regions remain completely free of the finishing agent to be applied. The air under pressure takes care that neither parts of the immediately sprayed agent nor parts of the vapor forming in the cabinet can enter the interior of the shoe or reach the sole. Furthermore, owing to the relative movement of the support with the shoes to be treated with respect to the spraying nozzles and the additional turning movement of the spraying nozzle that may be provided achieves an effective and even spray covering of the surface of the upper of the shoe. The additional adjustability of the height of the spraying nozzles as a whole permits the adaptation of the spraying area thereof to the different shoe sizes which are treated in the cabinet.

BRIEF DESCRIPTION OF THE DRAWINGS

Further details of the subject of the invention will become apparent from the following specification with reference to the accompanying drawings, in which:

FIG. 2 is a partial section through the arrangement in the area of the lifting table;

FIG. 3 is a continuation of FIG. 1 downwardly;

FIG. 4 shows a section through FIGS. 2 and 3, generally along the line IV—IV;

FIG. 5 is a top view of the area shown in FIGS. 2 and 3;

FIG. 6 is a front view of a preferred embodiment of the support;

FIG. 7 is a side view of a support in accordance with FIG. 6;

FIG. 8 is a side view of the support with spraying nozzles;

FIGS. 9 to 16 illustrate the individual phases of the spraying operation in which connection;

FIG. 9 shows the first phase of the spraying operation in side view;

FIG. 10 shows the same phase from the top;

FIG. 11 shows the second phase of the spraying operation in side view, and

FIG. 12 shows it from the top;

FIG. 13 illustrates the third phase of the spraying operation in side view, while, FIG. 14 shows the same operation from the top;

FIG. 15 shows the fourth phase of the spraying operation, and

FIG. 16 shows this operation from the top.

DESCRIPTION OF THE INVENTION

Figure 1:
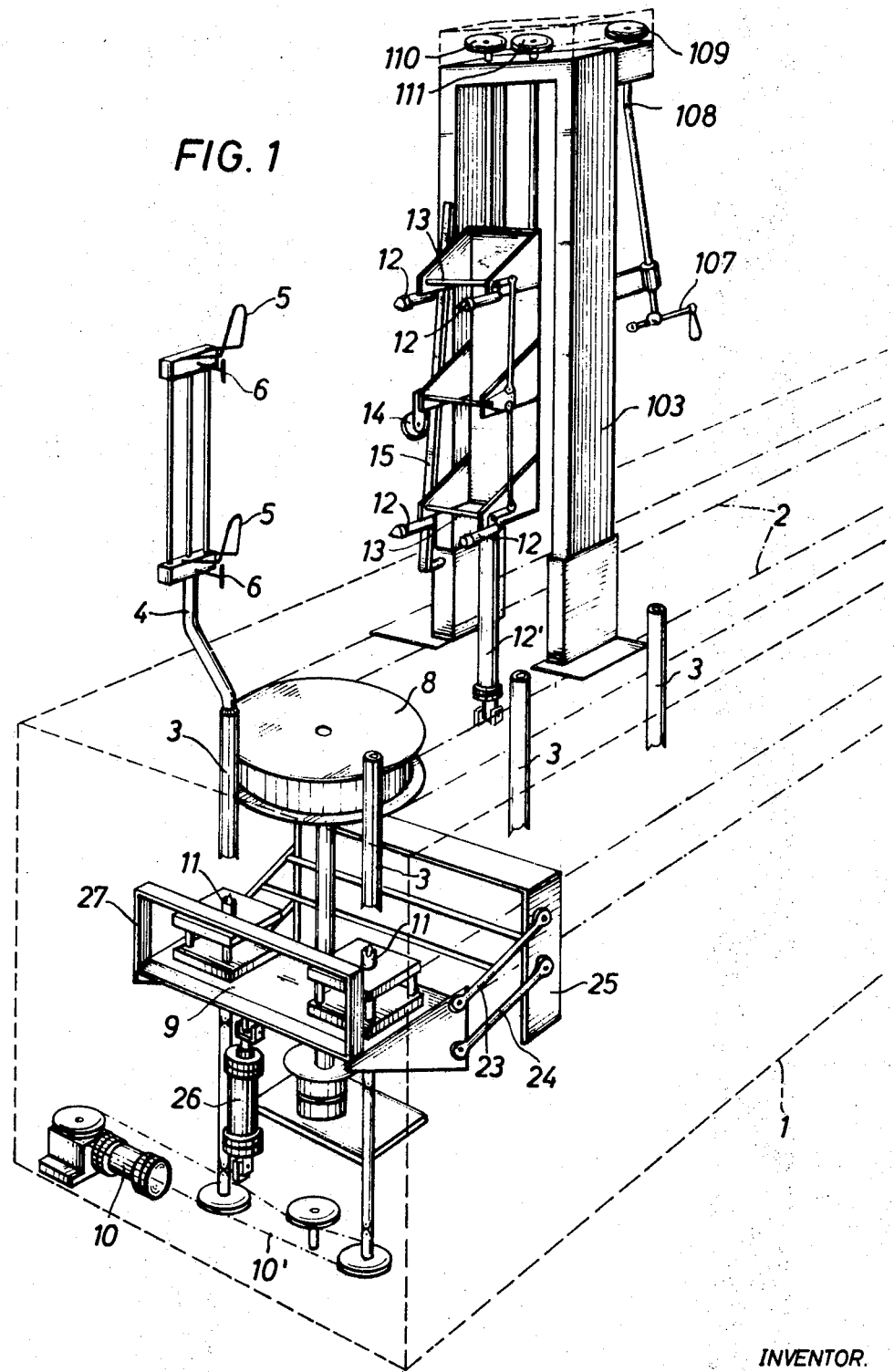
FIG. 1 illustrates in a perspective view the entire installation where the spraying cabinet is omitted to provide for clearer illustration and where only the parts of the transport arrangement illustrated that are essential for the invention.
Figure 9:
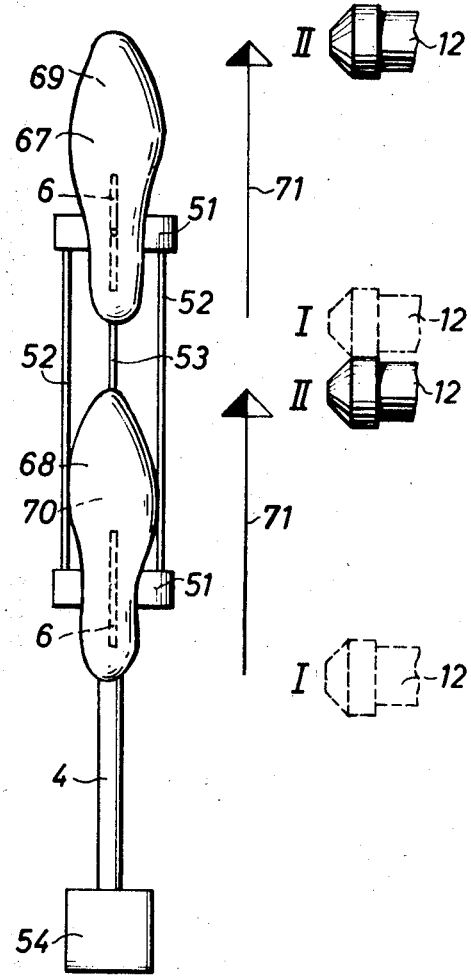
Figure 10:
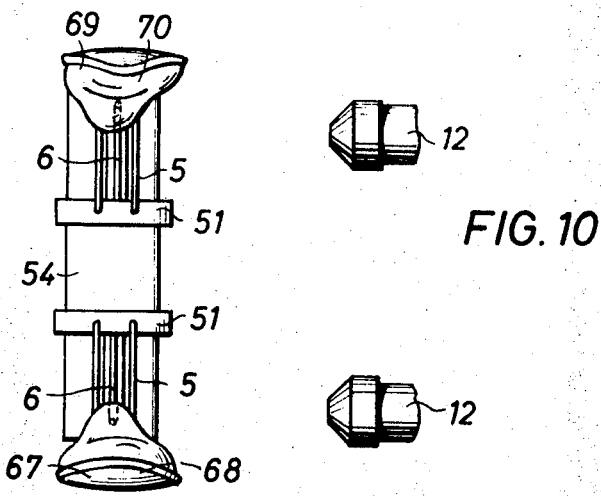
Figure 15:
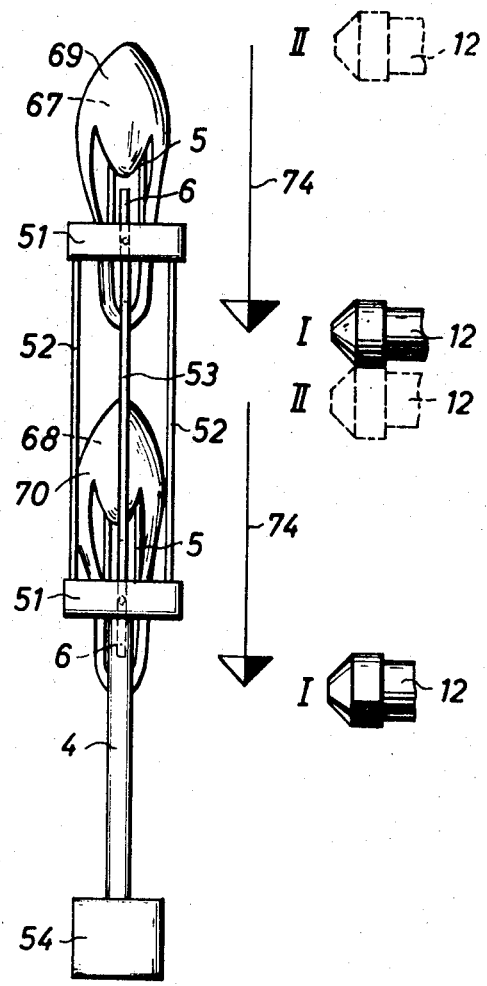
Figure 16:
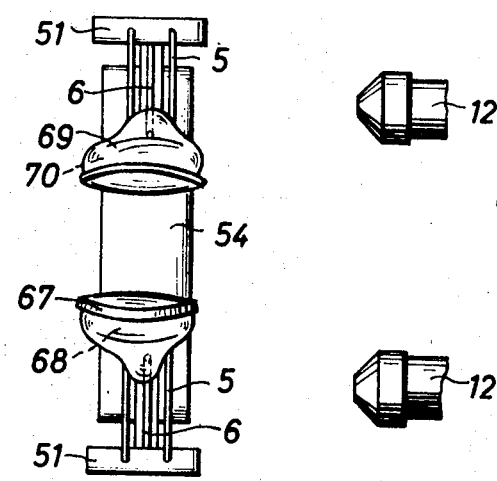

In a housing 1 schematically illustrated in interrupted lines in FIG. 1 a transport system 2 is accommodated which is indicated in dot and dash lines on which guiding spindles 3 are arranged in spaced relationship which carry supports 4, which in turn are equipped with yokes 5 for receiving the footwear to be treated. The entire apparatus is enclosed in a spraying cabinet which is not illustrated. The transport system 2 may be a system that is coordinated solely to the apparatus. Usually, however, it will serve an entire series of working stations in the production course of footwear, in which event, the arrangement in accordance with the invention would be the final station. In lieu of the support 4 illustrated with only two yokes 5, a double support may also be provided which is equipped with yokes 5 on both sides and thus has four yokes.

In accordance with the invention, the supports 4 are equipped with nozzle means 6 in addition to the yokes 5. The nozzle means 6 reach into the interior of the shoes that are mounted on the yokes 5. If it should be necessary further nozzle means may be provided which cover the bottom side of the shoes, i.e., the soles. However, these means are not illustrated in the drawings. It is thus accomplished that the finishing agent sprayed onto the footwear can neither enter the interior of the shoe nor can it cover the sole. These areas are kept free of the finishing agent sprayed onto the shoes by the air under pressure flowing out of the nozzle means.

At the return or turning location of the transport system 2 proximate the reversing roller 8, a lifting table 9 is arranged below the same which, while the guiding spindles 3 and thus the supports 4 are at standstill (as shown in FIG. 1) completes the connection to the necessary air under pressure and the connection with the turning means. In the embodiment illustrated, two guiding spindles 3 and supports 4 are always raised by the lifting table 9. Prior to the lowering the guiding spindles 3 are the supports 4 are turned with the shoes by means of a turning cylinder 10 with the drive means 10' through a 180° angle. Thus, first the one side of the shoe uppers is exposed to the sprayed finishing agent. Then the rotation of the supports 4 through 180° takes places. Thereupon, the other side of the shoe uppers is sprayed in a similar even manner.

Thus, with the arrangement in accordance with the invention not only the protection of the shoe interior and if desired, of the sole from the finishing agent is achieved, but furthermore, a completely even treatment of the top side of the shoe upper with the finishing agent.

For supplying the air under pressure to the support 4 and to the nozzle means 6, orifices 11 are provided on the lifting table which engage the lower end of the guide spindles 3 that are at standstill at any time above the lifting table.

The spraying nozzles 12 arranged in the spraying cabinet (not shown) at the stopping location of the support 4 are rotatably journalled on a horizontal shaft 13. The spraying nozzles 12 are moved up and down with their supporting means during the spraying operation by means of a lifting cylinder 12' in which connection a roller 14 is guided by a control member 15 so that during their upward and downward movement the nozzles 12 effect additionally a rocking movement in a vertical plane.

The region below the support 4 in their stopping area with the necessary means for connecting them with the transport system 2, the lifting table 9 and the rotating cylinder 10 is illustrated in FIGS. 2, 3 and 4, while FIG. 3 constitutes the continuation of FIG. 2 downwardly. The transport system 2 which may, for example, be a rotating band or a rotating chain is equipped with supports 18 arranged in spaced relationship for carrying the guiding spindles 3. These supports 18 may as illustrated in FIG. 2 be furthermore provided with supporting rollers 19 which rest on rails 21 suitably provided on the housing or on other structural components and which are thereby afforded an additional guidance. Such rollers may also be arranged at the upper end of the supports 18 that are not shown.

The guiding spindle 3 carries the support 4 which at its lower end is vertically slideable and pivotally moveable in horizontal direction in the guiding spindle 3 and which can be raised against the biasing force of a spring 4' by means of the lifting table 9. At the vertex of the transport system where with stepwise advancing thereof the stop of one or two guiding spindles 3 and thus of the respective supports 4 for the finish treatment of the footwear mounted thereon is given, the lifting table 9 is provided below the guiding spindle. This lifting table 9 is connected by a parallelogramic bar arrangement 23, 24 at a fixed point, for example, a frame 25 in the housing 1 and is moved up and down in vertical direction by a lifting cylinder 26, while a frame 27 may still be connected between the lifting cylinder 26 and the lifting table 9 by means of guide rollers 28 which insure of an accurate vertical up and down movement of the lifting table 9.

On the lifting table 9 one or two orifices 11 are arranged which in a manner not shown may be supplied, for example, with air under pressure from a source of compressed air by way of a hose connection. These orifices engage the lower end 25 of the supports 4 disposed oppositely therefrom as the lifting table 9 is raised, and thus provide these supports 4 and their nozzle means with air under pressure.

The orifice 11 as well as the lower end 29 of the support 4 are provided with interengaging catches 30. The orifice 11 may be turned by the rotating cylinder 10 by way of elements 10' and a rod 31 through a 180° angle or any other desired program. This turning movement is transmitted by way of the catches 30 to the supports 4. The rods are extensible in that they are constituted by two parts that are slidable in one another and not rotatable relative to one another.

FIG. 5 shows the drive means of the transport system 2 which by way of example has a sprocket wheel 8' which is driven in cadence by a chain (not shown), which chain, in turn is moved by a hydraulic drive means. All of the individual parts as well as the parts still to be described hereinafter are mounted in the housing 1 by the use of conventional structural means which need not be explained in detail.

The guidance or control of the entire installation, i.e., the advancing of the transporting system, the lifting and lowering of the supports 4, as well as the pivotal movements thereof, furthermore the movement of the spraying nozzles 12 and the charging of the same with finishing agent, finally the supplying of air under pressure to the supports 4 is accomplished with conventional and known driving and control means, for example by means of hydraulic drive means and electrical control circuits. For example, in FIG. 5 an end switch 34 is seen which is actuated by a cam wheel 35.

Although FIG. 1 illustrates an embodiment having a lifting table that is equipped with two orifices 11, it is also possible to have an embodiment provided with a lifting table having only one orifice 11. In that event a shape for the support may be selected where the drive means 10' for the two individual supports of a double support are arranged in the support itself.

FIGS. 6 and 7 show the upper part of a single support 4. As previously mentioned it has yokes 5 upon which shoes can be placed as indicated in dot and dash lines at 16 in FIG. 7. The nozzle devices 6 project toward the interior of these shoes as shown.

The yokes 5 are seated in transverse members 51 which are connected by vertical lateral bars 52. A tube 53 extends centrally thereof which supplies the upper nozzle arrangement with air under pressure that is introduced from the bottom through the hollow support 4.

If this support is to be constructed as a double support an intermediate transmission is provided which may be disposed in the support 4.

FIG. 8 illustrates the spraying nozzle disposition. In order to make it possible to adjust the initial level of the spraying nozzles in relation to the size of the shoes to be treated, the spraying nozzles are secured by means of their pivot axles on cantilever arms 101 which are part of a slide 102 in a standard 103. This slide is movable vertically up and down by way of a threaded spindle 104 in the standard 103. As shown, the lower end 105 of the spindle 104 can be journalled upon a ball 106. The driving of the spindle is effected by way of a hand wheel 107, a connecting rod 108, two chain pulleys 109 and 110 and a chain 111 connected therebetween.

The nozzles 12 are supplied with the treating agent by way of hose connections (not shown). As already mentioned the nozzles effect a pivotal movement in a vertical plane during the spraying process. This is accomplished by the roller 14 and the guiding member 15 on which the roller moves. The roller 14 and the rocking shaft 13 of the nozzles 12 are connected with one another by gearing comprising essentially levers 112, 113 and 114 and connecting bars 115 and 16.

The sequence of operation of the device is as follows: The plurality of supports 4 which are provided on the transporting system 2 are moved thereby in cadence into the spraying cabinet and come to a standstill in the position shown in FIG. 1. Now the lifting movement of the support 4 is started and simultaneously the air under pressure begins to flow and then the spraying nozzles 12 spray the finishing agent. Upon attaining the uppermost position of the support 4, the supply of compressed air and of the finishing agent is interrupted, and the support performs a rotation through 180°. As the downward movement of the support starts, the supply of compressed air and finishing agent also starts again. When the support reaches the lower position, the treatment process is terminated, the transport system moves one step further until the next support has reached the position described.

However, the course can be somewhat varied in order to reach the tongue of the shoe with the finishing agent satisfactorily. Then the nozzle 12 and the support 4 effect a somewhat more complicated movement, the individual phases of which are shown in FIGS. 9–16 and are described in detail hereinafter. The support here is shown as a double support with four shoes 67, 68, 69 and 70 on a connecting member 54. The double support in FIG. 9 has reached its stop area provided in front of the nozzles 12. Shoes 67–70 are facing the nozzles 12 at any time with one side. The nozzles 12 now effect a movement from the bottom (position I) to the top (position II) in the direction of the arrows 71. The side of the shoes 67–70 which faces the spray nozzles is accordingly sprayed with finishing agent or dressing. This course of movement between the spraying nozzles and shoes can, of course, also be obtained in that the spraying nozzles stand still and the shoes are moved in vertical direction. This does not in any way affect the relative course of movement between the spraying nozzles and the shoes.

After the first phase of the spraying operation, there follows a second phase where the supports 4 have been turned by the turning means by approximately 15°. The spraying nozzles 12 effect a movement from II to III in the direction of the arrows 72.

Now follows the third phase of the spraying operation where the shoes 67–70 upon the supports 4 are displaced by about 15° in the other direction with respect to the spraying nozzles 12. The spraying nozzles 12 move during this process again from the position III to the position II in the direction of the arrows 73.

The fourth phase of the spraying operation then terminates the entire treatment cycle, and now the shoes are turned by 180° with respect to their original position. The spraying nozzles 12 turn back from their positions II to their original position I in the direction of arrows 74.

By dividing up the spraying operation in these four phases, flawless treatment of the entire outside of the shoe upper is obtained. First, the spraying of the right side, or of the left side of each shoe takes place, then of the right or left part of the shoe tongue, thereupon the left or right part of the shoe tongue and, finally, the left or right side of each shoe. In this manner, an absolutely even application of the finishing agent or dressing onto all areas of the outside of the shoe upper is accomplished.

Having now described my invention with reference to the embodiments illustrated, what I desire to cover by Letters Patent is set forth in the appended claims.

I claim:

1. Apparatus for finish-spraying of shoes comprising a conveyer means in a housing and a spraying cabinet above said housing, said conveyer means being adapted to move shoes being treated through said spraying cabinet and spraying nozzles for finishing agent are disposed in said cabinet, said apparatus comprising supports having yokes mounted thereon adapted to support shoes, said supports and yokes being movable with said conveyer means into position of stand-still proximate said spraying nozzles, and blow nozzles disposed proximate said yokes for blowing compressed air against areas of the shoes not to be covered with finishing agent, for example, the insides of shoes.

2. Apparatus in accordance with claim 1 comprising guiding spindles connected with said conveyer means, said supports being mounted on said guiding spindles, means for raising and lowering said supports in a vertical plane and means for pivotally moving said supports in a horizontal plane including a lifting table adjacent said conveyer means.

3. Apparatus in accordance with claim 2 comprising at least one orifice member on said lifting table, said member having a catch adapted to engage a corresponding catch on a support when said lifting table is raised and being adapted to supply air under pressure to said support and thereby to a blow nozzle on said support and to impart lifting and turning movements to said support.

4. Apparatus in accordance with claim 3 where each spraying nozzle is disposed proximate the stand-still position of a support and supported on a slide mounted on a standard and movable upwardly and downwardly thereon and guide means are provided including a guide rail on said standard and a roller on said slide for moving said nozzles in a vertical plane.

5. Apparatus in accordance with claim 4 including means for rotating said supports horizontally through an angle of 180° between two end positions and through an angle of 15° with respect to each end position.

6. Apparatus in accordance with claim 4 including a threaded spindle connected to said slide for changing the level of the spraying nozzles supported on said slide.

7. Apparatus in accordance with claim 1 where each said support is provided with two yokes one above the other, each associated with at least one blow nozzle and one spray nozzle.

8. Apparatus in accordance with claim 7 including a pair of supports disposed parallel to one another and adapted to be stopped in the position of stand-still to provide support for four pairs of shoes.

9. Apparatus in accordance with claim 8, including an intermediate transmission acting between said supports and disposed below said lifting table.

References Cited

UNITED STATES PATENTS

| 2,088,542 | 7/1937 | Western | 118—301 X |
| 2,840,037 | 6/1958 | Verba | 18—321 X |
| 2,946,697 | 7/1960 | Petro | 118—301 X |
| 3,456,617 | 7/1969 | Way | 118—322 |

JOHN P. McINTOSH, Primary Examiner

U.S. Cl. X.R.

118—315, 321, 322, 326